US010547671B2

(12) United States Patent
Monroe

(10) Patent No.: US 10,547,671 B2
(45) Date of Patent: Jan. 28, 2020

(54) REMOTE POSTAGE PRINTING USING EFFICIENT LOAD BALANCING OF POSTAGE REQUESTS

(71) Applicant: Pitney Bowes Inc., Danbury, CT (US)

(72) Inventor: George T. Monroe, Seymour, CT (US)

(73) Assignee: Pitney Bowes Inc., Stamford, CT (US)

(*) Notice: Subject to any disclaimer, the term of this patent is extended or adjusted under 35 U.S.C. 154(b) by 790 days.

(21) Appl. No.: 15/241,320

(22) Filed: Aug. 19, 2016

(65) Prior Publication Data

US 2018/0054479 A1 Feb. 22, 2018

(51) Int. Cl.
G07B 17/00 (2006.01)
H04L 29/08 (2006.01)
G06Q 20/10 (2012.01)
H04L 29/06 (2006.01)

(52) U.S. Cl.
CPC ....... H04L 67/1023 (2013.01); G06Q 20/102 (2013.01); G07B 17/00435 (2013.01); H04L 67/1004 (2013.01); H04L 67/1012 (2013.01); H04L 67/1029 (2013.01); H04L 67/1034 (2013.01); H04L 67/42 (2013.01); G07B 2017/00064 (2013.01); G07B 2017/00967 (2013.01); H04L 2209/56 (2013.01)

(58) Field of Classification Search
CPC ............. H04L 67/1023; H04L 67/1004; H04L 67/1012; H04L 67/1029; H04L 67/1034; H04L 67/42; H04L 2209/56; G06Q 20/102; G07B 17/00435; G07B 2017/00064; G07B 2017/00967
USPC ......................................................... 705/60
See application file for complete search history.

(56) References Cited

U.S. PATENT DOCUMENTS

| 7,251,632 | B1* | 7/2007 | Ogg ................. G07B 17/00733 705/401 |
| 2002/0087684 | A1* | 7/2002 | Foth ........................ H04L 29/06 709/225 |
| 2003/0187666 | A1 | 10/2003 | Leon | |
| 2005/0138469 | A1* | 6/2005 | Ryan, Jr. .......... G07B 17/00733 714/20 |
| 2008/0225718 | A1* | 9/2008 | Raja .................... H04L 67/1012 370/235 |
| 2011/0267638 | A1 | 11/2011 | Ryan | |
| 2014/0032807 | A1 | 1/2014 | Monroe | |

FOREIGN PATENT DOCUMENTS

| EP | 2690841 A1 | 1/2014 |
| WO | 01/29741 A2 | 4/2001 |

* cited by examiner

Primary Examiner — James D Nigh
(74) Attorney, Agent, or Firm — Brian A. Lemm; Charles R. Malandra, Jr.

(57) ABSTRACT

Systems and methods that allow only a single PSD to be used for a customer regardless of the number of servers in the system are provided. This is accomplished by allowing each server to communicate with the other servers in the system, such that each server can determine which customer PSDs are coupled to each of the other servers. As requests are routed to a first server by the load balancer, if the first server does not have the specific customer's PSD installed, it can determine which server has that customer's PSD and forward the request to that second server. Once the request has been processed by the second server, the response is sent back to the first server that received the request for return to the customer.

2 Claims, 2 Drawing Sheets

REMOTE POSTAGE PRINTING USING EFFICIENT LOAD BALANCING OF POSTAGE REQUESTS

FIELD OF THE INVENTION

The invention disclosed herein relates generally to systems and methods for dispensing evidence of postage payment, and more particularly to online postage dispensing systems in which multiple servers are utilized for the generation of postage.

BACKGROUND OF THE INVENTION

Postage metering systems generate encrypted information that is printed on a mail piece as part of an indicium evidencing postage payment. The encrypted information includes a postage value for the mail piece combined with other postal data that relate to the mail piece and the postage meter printing the indicium. The encrypted information authenticates and protects the integrity of the information, including the postage value, imprinted on the mail piece for later verification of postage payment. Since the indicium incorporates the encrypted information relating to the evidencing of postage payment, altering the printed information in an indicium is detectable by standard verification procedures.

Conventional postage printing systems utilize pre-paid accounts in which funds are stored in a register for use to generate and print postage. Such funds are stored in a secure device, known as a postal security device (PSD). A PSD is a secure processor-based accounting device that dispenses and accounts for postal value stored therein. The PSD generates indicia for printing on mail pieces, utilizing the funds stored therein. The United States Postal Service ("USPS") has approved personal computer (PC) postage metering systems as part of the USPS Information-Based Indicia Program ("IBIP"). One type of system that supports PC postage metering systems utilizes a PSD that is coupled to a server at a data center that is remote from the PC and accessible through the Internet. The PC runs application software or a web browser for requesting postage indicia from the server located at the data center. All functions required for generating an indicium are performed by the PSD coupled to the server, and the results are returned to the PC where the indicium can be printed on a mail piece or label.

Each PSD is initialized for and thus dedicated to only a single customer (also referred to as a client). Thus, to handle multiple customers, it is necessary to provide multiple PSD's to handle transaction requests from each respective customer. Thus, a server can have multiple PSD's coupled to it such that each PSD can handle a different transaction simultaneously. When a customer requests a postage indicium, the request is sent to the PSD designated for that customer for processing of the transaction, and the results returned to the PC being used by the customer.

In some markets, each PSD is dedicated to only a single customer. Thus, as new customers are added, it requires additional PSDs, one for each of the new customers. Each server can only support a limited number of PSDs, thus it is also necessary to add additional servers to handle the increase in customers. A load balancer distributes the requests for postage among the multiple servers based on a server selection criteria configured in the load balancer. For those markets in which a PSD is dedicated to only a single customer, each server is required to have a PSD that is dedicated to each respective customer (one for each and every customer), as the load balancer has no knowledge of which server houses the PSD for the customer making the request. Thus, regardless of the server that receives the request from the load balancer for postage from that customer, there is a PSD dedicated to that customer coupled to the server to process the request.

Having multiple PSDs for each customer, one coupled to each server, creates several problems. From a system point of view, needing to place a customer specific PSD in every server in the environment limits the number of customers that can be supported in the environment. This also makes the system unnecessarily large and complicated, especially if there are numerous customers that are low volume mailers and do not use the system frequently. From the customer point of view, funds must be placed in each PSD that is installed for that customer. Thus, for example, if a customer normally spends $50 per day in postage, each PSD that is installed for the customer must have $50 in its registers for postage. For a 6 server environment, for example, this would require the customer to put a total of $300 in postage into the PSDs, $50 in each PSD. Even though the customer may only spend $50 a day, there is no control over which PSD will actually be utilized throughout the day. Thus, it is possible that only one of the six PSDs for that customer will be used for the entire $50, or more than one PSD may be used over the course of the day. Each of these drawbacks leads to problems with the system and problems with customer acceptance.

SUMMARY OF THE INVENTION

The present invention alleviates the above problems by providing a system and method that allows only a single PSD to be used for a customer regardless of the number of servers in the system. This is accomplished by allowing each server to communicate with the other servers in the system, such that each server can determine which customer PSDs are coupled to each of the other servers. As requests are routed to a first server by the load balancer, if the first server does not have the specific customer's PSD installed, it can determine which server has that customer's PSD and forward the request to that second server. Once the request has been processed by the second server, the response is sent back to the first server that received the request for return to the customer. There are numerous advantages provided by this solution. Only a single PSD needs to be added to the system for each customer, and the PSD can be placed in any of the servers. This can significantly increase the number of customers that can be supported by the environment. As new servers are added to support new customers, current customers do not need to obtain an additional PSD for the new servers. Additionally, the amount of funds required for the customer to commit to the PSD is minimized, as only a single PSD needs to be funded.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, by way of example serve to explain the invention in more detail. As shown throughout the drawings, like reference numerals designate like or corresponding parts.

DETAILED DESCRIPTION OF THE PRESENT INVENTION

Figure 1:
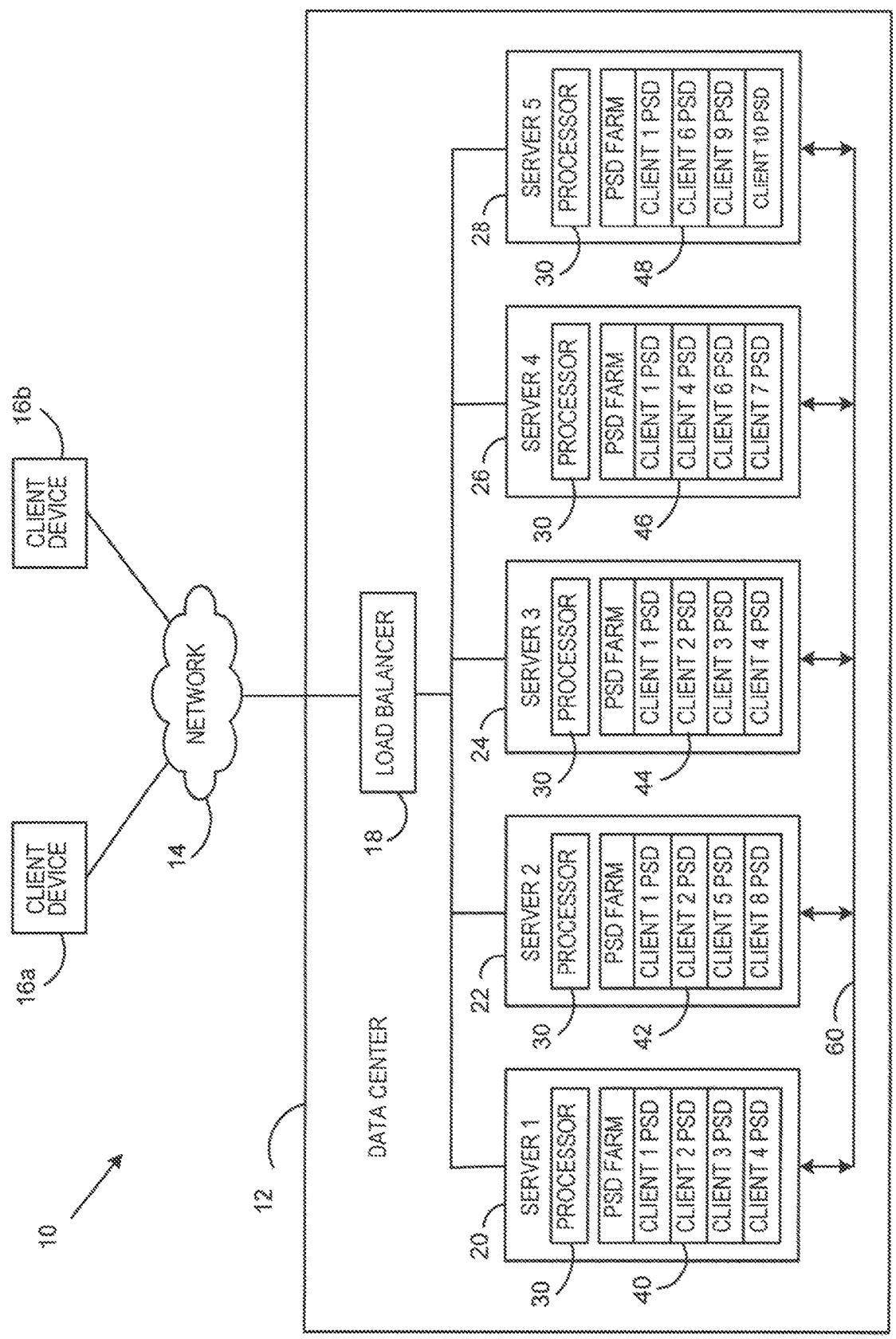
FIG. 1 illustrates in block diagram form a system according to an embodiment of the present invention.

In describing the present invention, reference is made to the drawings, wherein there is seen in FIG. 1 in block diagram form a system 10 according to an embodiment of the present invention. System 10 includes a data center 12 operated by a postage provider. The data center 12 is coupled to a network 14, such as, for example, the internet. Customers of the postage provider communicate with the data center 12 using one or more client devices 16a, 16b coupled to the network. Client devices 16a, 16b can be any type of processing device, such as for example a personal computer, mailing machine, laptop, tablet, etc. While only two client devices 16a and 16b are illustrated in FIG. 1, it should be understood that there can be any number of such devices that can access the data center 12.

Each of the client devices 16a. 16b are used by a respective client to request postage from the data center 12 via the network 14. The data center includes a plurality of servers 20, 22, 24, 26, 28 that are utilized to generate indicia for return to the requesting client device 16a, 16b for printing using a local printer (not shown). Each of the servers 20-28 may be a mainframe or the like that is specially constructed for the required purposes, or it may comprise a general purpose computer selectively activated or reconfigured by a computer program stored therein to perform the required functions. Such a computer program may alternatively be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, which are executable by a processing device 30 within each server 20-28. One of ordinary skill in the art would be familiar with the general components of a server system upon which the method of the present invention may be performed. While FIG. 1 illustrates five servers, it should be understood that any number of servers can be provided.

Data center 12 includes a load balancer 18 that receives requests from the client devices 16a, 16a and routes them to one of the servers 20-28 for processing based on a server selection criteria configured in the load balancer. Each server 20-28 includes a respective PSD Farm 40, 42, 44, 46, 48, each of which holds a plurality of postage security devices (PSD's). A PSD is a secure processor-based accounting device that dispenses and accounts for postal value stored therein. The PSD generates indicia for printing on mail pieces, utilizing the funds stored therein. Each of the PSD's in each server is assigned to only one specific client, and thus can only generate postage for that specific client. Each PSD Farm 40, 42, 44, 46, 48 includes one or more PSD's that are dedicated to a specific client. Thus, as illustrated in FIG. 1 for example only, PSD Farm 40 includes a PSD for Client 1, Client 2, Client 3, and Client 4; PSD Farm 42 includes a PSD for Client 1, Client 2, Client 5, and Client 8; PSD Farm 44 includes a PSD for Client 1, Client 2, Client 3, and Client 4; PSD Farm 46 includes a PSD for Client 1, Client 4, Client 6, and Client 7; and PSD Farm 48 includes a PSD for Client 1, Client 6, Client 9, and Client 10. It should be understood that the number of PSD's and the clients to which they are dedicated in FIG. 1 is for illustrative purposes only. The number of PSD's included in each PSD Farm is limited only by the physical and operative constraints of each server, and the PSD's included in a server can be dedicated to any client desired. Some clients may have more than one dedicated PSD within the data center 12 (especially for larger clients that make a large amount of requests for postage daily) while other clients may only have a single dedicated PSD within the entire data center 12 (for example smaller clients that do not make a lot of requests for postage). Thus, the system 10 differs significantly from conventional systems in that it is not necessary for each server in the system 10, e.g., servers 20-28, to have a dedicated PSD for every client served by the data center 12. Only a single PSD needs to be added to the system for each customer (client), and the PSD can be placed in any of the servers. This can significantly increase the number of customers that can be supported by the data center 12. In addition, since each client need only provide funds in the PSD's dedicated to it, for those clients that only have one (or a few) PSD, this significantly reduces the amount of funds that are required to be deposited with the data center 12.

Each of the servers 20-28 in the data center 12 are coupled by a communication line 60 that allows the processors 30 within each serve 20-20 to communicate with the others. Each respective processor 30 within each server 20-28 keeps a record of the PSD's included in its respective PSD farm 40-48 based on the respective client, and shares this information with each of the other processors 30 in the other servers 20-28. For example, processor 30 in server 20 has a record of which client PSD's are installed in its PSD farm 40 (e.g., a PSD for Client 1, Client 2, Client 3, and Client 4), and also obtains, via the communication line 60, and maintains a record about the client PSD's that are installed in each of the PSD farms 42-48 of the other servers 22-28. Thus, the respective processor 30 in each of the servers 20-28 has a record of every PSD and the client to which it is dedicated regardless of the PSD farm 40-48 of the server 20-28 in which the PSD is actually located.

Figure 2:
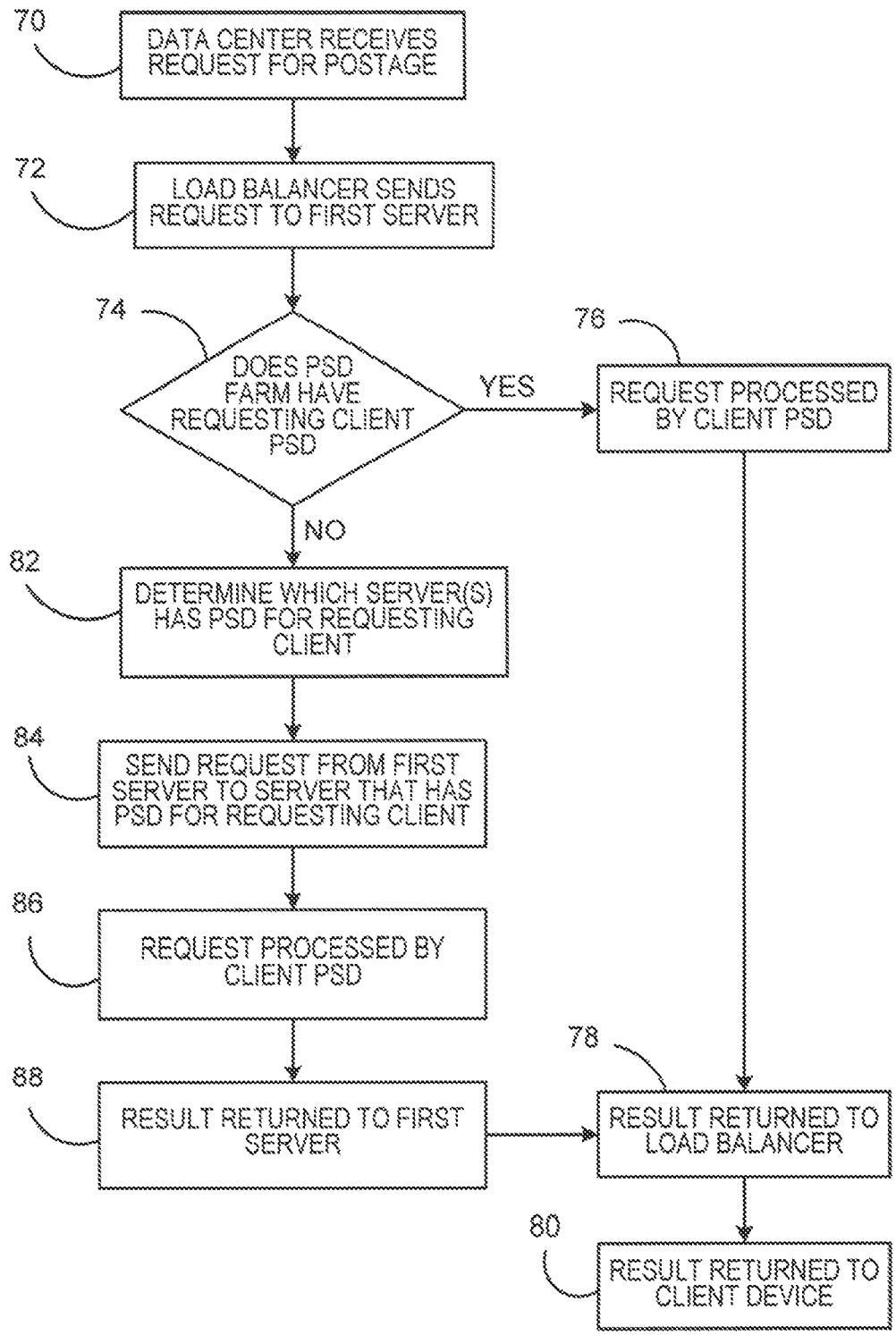
FIG. 2 illustrates in flow diagram form the operation of the system of FIG. 1 according to an embodiment of the present invention.

FIG. 2 illustrates in flow diagram form the operation of the system 10 of FIG. 1 according to an embodiment of the present invention. In step 70, the data center 12 receives a request from a client wishing to obtain an indicium that evidences payment of postage utilizing a client device, e.g., device 16a. This can be done, for example using a web browser or other software application operating on the client device 16a. The request includes information about the client, e.g., client user name, password, etc. that allows the data center 12 to verify that the customer is registered with the data center 12. Upon successful verification of the user, in step 72 the load balancer 18 sends the request to one of the servers 20-28 within the data center 12 based on a server selection criteria configured in the load balancer 18 (hereinafter referred to as the first server). Even though the load balancer 18 has no knowledge of which server or servers 20-28 may house a PSD for the client making the request, no changes are necessary to the server selection criteria of the load balancer 18, as the present invention makes the PSD dedicated to that client appear to be in each PSD farm 40-48 of each of the servers 20-28 without any changes to the load balancer 18.

When the request has been received by the first server, in step 74 the processor 30 of the first server determines if a PSD dedicated to the requesting client is installed in its respective PSD farm based on the record of the PSD's included in its respective PSD farm. If there is a PSD dedicated to the requesting client installed in its respective PSD farm, then in step 76 the first server uses that client PSD to process the request and generate the requested postage. In step 78, the processing results (e.g., an indicium that indicates payment of postage) is returned to the load balancer 18, and in step 80 the processing results are returned to the client device 16*a* for printing.

If in step 74 the first server determines that there is not a PSD dedicated to the requesting client in its respective PSD farm, then in step 82 the processor 30 of the first server determines which server(s) does have a PSD dedicated to the requesting client in its respective PSD farm. There may be only one server that has a PSD dedicated to the requesting client, or more than one server. In step 84, the processor 30 of the first server sends the request to a second server that does have a PSD dedicated to the requesting client in its respective PSD farm. In step 86 the processor 30 of the second server uses the PSD dedicated to the requesting client in its respective PSD farm to process the request and generate the requested postage. In step 88, the processing results (e.g., an indicium that indicates payment of postage) is returned to the first processor, and then in step 78 the first processor returns the processing results to the load balancer 18. In step 80, the processing results are returned to the client device 16*a* for printing. Thus, from the perspective of the load balancer 18, regardless of the path taken in step 74, the request was processed by the first server (since the results from both paths were returned to the load balancer 18 by the first processor), even though in reality the request was not processed by the first server and instead by a different server in following the second path.

As a specific example for illustrative purposes only using the system 10 as illustrated in FIG. 1, suppose for example that Client 5 uses client device 16*a* to request postage from the data center 12. The load balancer selects Server 24 to process the request. PSD Farm 44 of Server 24 does not contain a PSD dedicated to Client 5, but knows that Server 22 has a PSD for Client 5 in its PSD Farm 42. The request is sent from Server 24 to Server 22 for processing by the Client 5 PSD in PSD Farm 42. The processing results are returned from Server 22 to Server 24, which then sends the results back to the load balancer 18 which sends it back to the client device 16*a*.

As should be clear from the above description, there are numerous advantages provided by this solution. Only a single PSD needs to be added to the system for each customer, and the PSD can be placed in any of the servers. This can significantly increase the number of customers that can be supported by the data center. As new servers are added to support new customers, current customers do not need to obtain an additional PSD for the new servers. Additionally, the amount of funds required for the customer to commit to the PSD is minimized, as only a single PSD needs to be funded. While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A system for dispensing postage to a plurality of remote devices over a network, the system comprising:
    a plurality of servers, each of the plurality of servers having a plurality of postal security devices for generating postage coupled thereto, each of the plurality of postal security devices being dedicated to a respective client, wherein at least one server of the plurality of servers does not have a postal security device for each client supported by the system, and further wherein each of the plurality of servers maintains a record of the postal security devices coupled to each of plurality of servers within the system;
    a load balancer coupled to each of the plurality of servers, the load balancer adapted to receive a request for postage from a client using one of the plurality of remote devices over the network and route the request to a first server of the plurality of servers based on a server selection criteria, the load balancer not having any knowledge of which server of the plurality of servers has a postage security device dedicated to the client making the request; and
    a communication path between each of the plurality of servers,
    wherein the first server is adapted to determine if it has a postal security device dedicated to the client making the request coupled thereto, and if the first server determines it has a postal security device dedicated to the client making the request coupled thereto, the first server is further adapted to process the request using the postal security device dedicated to the client making the request and return a result to the load balancer for return to the one of the plurality of remote devices, and if the first server determines that it does not have a postal security device dedicated to the client making the request coupled thereto, the first server is further adapted to determine which of the plurality of servers does have a postal security device dedicated to the client making the request coupled thereto, and send the request for postage to a second server that does have a postal security device dedicated to the client making the request coupled thereto for processing of the request, the second server adapted to process the request using the postal security device dedicated to the client making the request and return a result to the first server, the first server further adapted to return the received result to the load balancer for return to the one of the plurality of remote devices.

2. A method for dispensing postage from a data center to a remote device over a network, the data center including a plurality of servers, each of the plurality of servers having a plurality of postal security devices for generating postage coupled thereto, each of the plurality of postal security devices being dedicated to a respective client, at least one server of the plurality of servers does not have a postal security device for each client supported by the data center, the method comprising:
    receiving, at the data center via the network, a request for postage from a client using a remote device;
    selecting, by a load balancer, a first server of a plurality of the servers to process the request based on a server selection criteria, the load balancer not having any knowledge of which server of the plurality of servers has a postage security device dedicated to the client making the request;

determining, by the first server, if the first server has a postal security device dedicated to the client making the request coupled thereto;

if the first server determines it has a postal security device dedicated to the client making the request coupled thereto, processing, by the first server the request using the postal security device dedicated to the client making the request and returning a first server result to the load balancer;

if the first server determines that it does not have a postal security device dedicated to the client making the request coupled thereto, determining by the first server which of the plurality of servers does have a postal security device dedicated to the client making the request coupled thereto based on a record of the postal security devices coupled to each of plurality of servers within the data center that is maintained by each of the plurality of servers;

sending, by the first server, the request for postage to a second server that does have a postal security device dedicated to the client making the request coupled thereto;

processing, by the second server, the request using the postal security device dedicated to the client making the request and returning a second server result to the first server;

returning, by the first server, the second server result received from the second server to the load balancer; and returning, by the load balancer, the first server result or the second server result from the load balancer to the remote device.

* * * * *